(12) United States Patent
Lalgudi (10) Patent No.: US 8,656,176 B2
(45) Date of Patent: Feb. 18, 2014

(54) SIMPLE VISUAL AUTHENTICATION OF DOCUMENTS EXCHANGED IN COMMERCE

(75) Inventor: Rajaram Natarajan Lalgudi, Chennai (IN)

(73) Assignee: Empire Technology Development LLC, Wilmington, DE (US)

( * ) Notice: Subject to any disclaimer, the term of this patent is extended or adjusted under 35 U.S.C. 154(b) by 991 days.

(21) Appl. No.: 12/257,140

(22) Filed: Oct. 23, 2008

(65) Prior Publication Data

US 2010/0058438 A1    Mar. 4, 2010

(30) Foreign Application Priority Data

Sep. 1, 2008   (IN) ............................ 2131/CHE/2008

(51) Int. Cl.
*H04L 9/32*   (2006.01)

(52) U.S. Cl.
USPC ............ 713/176; 713/168; 713/170; 713/179

(58) Field of Classification Search
USPC ...................................................... 713/2, 168
See application file for complete search history.

(56) References Cited

U.S. PATENT DOCUMENTS

| | | | |
|---|---|---|---|
| 6,757,826 B1 * | 6/2004 | Paltenghe ...................... | 713/170 |
| 7,200,576 B2 * | 4/2007 | Steeves et al. .................... | 705/64 |
| 7,237,115 B1 * | 6/2007 | Thomas et al. ................ | 713/176 |
| 7,480,796 B2 * | 1/2009 | Kwan ............................ | 713/161 |
| 2002/0129255 A1 * | 9/2002 | Tsuchiyama et al. ......... | 713/176 |
| 2005/0219076 A1 * | 10/2005 | Harris .............................. | 341/51 |
| 2007/0011265 A1 * | 1/2007 | Liezenberg et al. ........... | 709/217 |
| 2009/0245506 A1 * | 10/2009 | Ciet et al. ......................... | 380/28 |
| 2011/0231645 A1 * | 9/2011 | Thomas et al. ............... | 713/150 |

OTHER PUBLICATIONS

Chin-Chen Chang; Chi-Yien Chung;, "An enhanced buyer seller watermarking protocol," Communication Technology Proceedings, 2003. ICCT 2003. International Conference on , vol. 2, No., pp. 1779-1783 vol. 2, Apr. 9-11, 2003 doi: 10.1109/ICCT.2003.1209872 URL: http://ieeexplore.ieee.org/stamp/stamp.jsp?tp=&arnumber=1209872&isnumber=27227.*

Chin-Chen Chang; Chi-Yien Chung; , "An enhanced buyer seller watermarking protocol," Communication Technology Proceedings, 2003. ICCT 2003. International Conference on , vol. 2, No., pp. 1779-1783 vol. 2, Apr. 9-11, 2003 doi: 10.1109/ICCT.2003.1209872 URL: http://ieeexplore.ieee.org/stamp/stamp.jsp?tp=&arnumber=1209872&isnumber=27227.*

* cited by examiner

*Primary Examiner* — Saleh Najjar
*Assistant Examiner* — Feliciano Mejia
(74) *Attorney, Agent, or Firm* — Brundidge & Stanger, P.C.

(57) ABSTRACT

Verifying the integrity of a received binary object by calculating a first displayable authenticator derived from an input binary object. The first authenticator is then attached to the input binary object, producing a first composite binary object, which is sent to a remote receiver. A second composite binary object is received back from the remote receiver, wherein the second composite binary object includes a received binary object, a received first displayable authenticator, and a second displayable authenticator. A third displayable authenticator is calculated, derived from the second composite binary object, then a display of the first displayable authenticator is compared to a display of the third displayable authenticator, and verification of the integrity of the received binary object is indicated by an exact match between displays of the first and third displayable authenticators.

23 Claims, 3 Drawing Sheets

|  | Item Code | Number |  |
|---|---|---|---|
| Cosmetics | 235 | 4 |  |
| Soap | 582 | 2 |  |
| Grocery | 425 | 6 |  |
| Toy | 983 | 1 |  |
| Book | 592 | 1 |  |

7

→ Buyer's Visual Authenticates (Saw Booth)
8

| | Item Code | Number |
|---|---|---|
| Cosmetics | 235 | 4 |
| Soap | 582 | 2 |
| Grocery | 425 | 6 |
| Toy | 983 | 1 |
| Book | 592 | 1 |

7a  8a

| | Invoice | | |
|---|---|---|---|
| Cosmetics | 235 | 4 | 200.00 |
| Soap | 582 | 2 | 30.00 |
| Grocery | 425 | 6 | 18.00 |
| Toy | 983 | 1 | 8.00 |
| Book | 592 | 1 | 45.00 |

10   12

Seller's Visual Authenticater (Sine) 11

SIMPLE VISUAL AUTHENTICATION OF DOCUMENTS EXCHANGED IN COMMERCE

CROSS-REFERENCE TO RELATED APPLICATION

The present application claims the benefit of Indian Patent Application No. 2131/CHE/2008, filed Sep. 1, 2008, which is hereby incorporated by reference in its entirety.

BACKGROUND

Certain commercial transactions involve participants (e.g., buyer or seller) who are not sophisticated. There may also be a mismatch in bargaining power or the like which makes it easy for one participant to take advantage of the other participant. In such situations, increasing the confidence of the participants will facilitate commerce.

SUMMARY

The present application relates, in general, to methods of improved authentication of documents exchanged in commerce. The present application achieves improved authentication by including visual markings derived from the content of the documents to be authenticated.

The foregoing is a summary and thus contains, by necessity, simplifications, generalization, and omissions of detail; consequently, those skilled in the art will appreciate that the summary is illustrative only and is not intended to be in any way limiting. Other aspects, features, and advantages of the devices and/or processes and/or other subject matter described herein will become apparent in the teachings set forth herein. The summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE FIGURES

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatus, computer programs and systems related to simple visual verification of documents used in commerce.

Embodiments described herein describe verifying the integrity of a received binary object by calculating a first displayable authenticator derived from an input binary object. The first authenticator is then attached to the input binary object, producing a first composite binary object, which is sent to a remote receiver. A second composite binary object is received back from the remote receiver, wherein the second composite binary object includes a received binary object, a received first displayable authenticator, and a second displayable authenticator. A third displayable authenticator is calculated, derived from the second composite binary object, then a display of the first displayable authenticator is compared to a display of the third displayable authenticator, and verification of the integrity of the received binary object is indicated by an exact match between displays of the first and third displayable authenticators.

Electronic transactions commonly take place over the internet. Increasingly, the electronic transactions may also use a mobile phone as a terminal device. Other kinds of terminal devices may be used, for instance a desktop PC or a laptop PC. Nothing is limited in regard to the kind of terminal device that can be used with the embodiments described herein, unless explicitly stated. For any type of terminal device used, an electronic transaction includes a series of actions, and an exchange of instruments (i.e., documents) between a buyer and a seller, who typically are remotely located from each other. After the initial browsing, selection and decision, the buyer submits a cart of items for purchase to the seller's website through his or her (generically, "his") terminal device. The items may include, for instance, goods or services. The transaction may continue with the seller presenting an invoice, the buyer agreeing to or authorizing a payment, the seller acknowledging the receipt of money (e.g., from a credit card, etc.), and the buyer acknowledging the delivery of the items so purchased.

The transaction model described above may include supporting documents such as: a purchase order, which indicates the goods and services that the buyer is interested in buying; an invoice from the seller indicating the seller's conditions for making the sale (e.g., cost, payment terms, delivery term, etc.); a payment authorization by the buyer (e.g., check or credit card information); a receipt from the seller for the payment; and proof of delivery (e.g., a mail delivery signature). These documents are exchanged remotely, between the buyer and the online seller. These documents may also be referred herein as "legal instruments" or "instruments."

Trust between the parties may be established by, for instance, a history of successful transactions, or by reputation. If trust has not been established, or if the trust that has been established does not apply to the current transaction because of a significant change in the nature of the transaction (e.g., a different type of good or service, or a higher monetary value), the exchange of documents supporting a transaction may be accompanied by a certain level of discomfort. For instance, the buyer may be unsure that he is exchanging these instruments with an authentic seller; or the buyer may be wary that seller may claim non-receipt of money; or whether the buyer can challenge instruments produced by the seller if fraud is suspected. Conversely, the seller trusts that the payment produced by the buyer is valid (e.g., checks are not forged; checks are drawn on an account having sufficient funds available; a credit card number has not been stolen, etc.). In order for this system to work, the buyer and seller have faith in the system.

Typically in consumer transactions, the buyer is less sophisticated than the seller. For instance, the buyer maybe an individual and the seller is a commercial concern; or the buyer may be an infrequent buyer online, but the seller may frequently conduct business online with many different buyers. In this kind of situation, the buyer is at a disadvantage to the seller. Further, the remoteness of the seller or the sophistication of the electronic technology may further intimidate the buyer. The buyer may be unable to complain effectively to the seller (e.g., to whom to complain), and an unscrupulous seller may have the resources and the technical sophistication to harass the buyer. For instance, if this happens in a credit card transaction, the buyer may be forced to become involved in an unpleasant conflict resolution between the credit card company and the seller.

In another scenario, the transaction between buyer and seller may be a "micro transaction," i.e., a transaction having a low monetary value. The low monetary value encourages entering into a transaction more quickly and with a less intensive review of the legal instruments. If the seller repudiates or otherwise does not carry out his end of the transaction, the buyer will be unhappy but may not feel it is worth his time and effort in order to secure a refund.

It would be desirable to provide the buyer in an online transaction a higher level of trust, similar to the level of trust that the buyer would experience in a face to face transaction. At the same time, the cost of building trust through third party verifiers and certifiers has to be minimized for low value retail level commerce. For instance, a buyer in an online transaction would feel more comfortable when he has a physical invoice that cannot be repudiated by the seller, and/or an ability to show the legal instruments associated with a transaction, and to be able to verify simply that the legal instruments are genuine (e.g., complete, that they are for the present transaction, and they are not tampered with). In emerging markets, where often buyers are not sophisticated and may have limited literacy, one way of providing simple verification is to provide a visual method to ensure that the legal instruments are genuine. For example, in conventional commerce, a letterhead, a logo, a seal and/or a signature on the instruments of the seller builds trust. A visual verification method of this sort should prevent repudiation of the documents by the seller. A visual method may employ textual strings or the like, or may employ a method that is graphic in nature, either alone or in combination with textual strings. A visual graphical method that is uniquely associated with the instrument and the seller and is easily and visually recognizable provides a robust method of document verification, particularly for unsophisticated users, or mobile users, or when micro transactions are involved.

Embodiments described herein are usable with other types of transactions that include an exchange of any kind of document involving a degree of trust, e.g., contracts under negotiation and revision; works that are a product of collaboration between more than one contributor, etc. Such types of transactions can benefit from a simple way to ensure that the documents involved are genuine.

The embodiments herein describe a visual authentication technique that makes a party to a transaction (e.g., the buyer) comfortable that: (1) he has non-repudiatable record of documents grouped together for a particular transaction without the involvement of any third party certification; and (2) he can make an immediate visual assessment of irregularity which maybe either deliberate (e.g., fraud) or inadvertent (e.g., technical mistake or transmission error). The intent is to improve the feeling of comfort to a buyer, in particular to an unsophisticated buyer, in a remote electronic transaction as he would get in a physical face to face transaction.

An embodiment of the method begins with the buyer and seller, each having at least two characteristic mathematical functions embodied in a computing device. Ordinarily, this will be the same computing device as that which embodies a binary object that is to be exchanged as part of a commercial transaction, but a different computing device may be used if a communication means is provided between a device embodying the binary object and a device embodying the mathematical functions. Typically, the buyer and seller have separate computing devices and separate mathematical functions. In general, the buyer and seller may have differing embodiments of this concept, i.e., the buyer and seller may have an unequal number of functions—any number two or greater—that combine together to provide a visual graphical pattern that is recognizably unique to the buyer and/or seller. There is no relationship or dependency of the buyer's group of functions with those of the seller.

The embodiments presented above are realizable in a computing device configured to receive an input binary object, perform functional computations on the input binary object, and/or perform display-related computations. Such a device may include, for instance, any combination of: a general purpose computer; an embedded processor; a special-purpose processor; a CPU; an ASIC; firmware. The computing device may further include software that carries out at least a portion of the calculations used in the embodiments presented above.

While a function that captures the characteristic of a binary object by generating a unique value representative of the binary object has some similarities to a hash function, the embodiments described herein are not restricted to this terminology. Rather, the function(s) used in the embodiments described herein should not be easily decipherable given the input and output.

A hash function is a well-defined mathematical function for turning a binary object into an output that is dependent upon the content of the binary object. The output of the hash function may be used for further processing. A good hash function used in the context of the present application should map the expected inputs as evenly as possible over its output range, i.e., the hash function should exhibit good uniformity. That is, a very large majority of the hash values in the output range should be generated with roughly the same probability. The reason for this is to minimize false authentications, wherein two different input binary objects produce the same hash value output. The uniformity property should extend to subsets of all possible binary objects, so that a minor change in the binary object does not result in a high probability of producing the same output from the hash function. Furthermore, it is important that any alteration of the binary object should have a high probability of resulting in a new output that is distinguishable from the previous one.

Examples of hash functions in the context herein may include addition of all bytes in the binary object; or addition of a set of numbers derived by considering strings of n bits from the binary object.

In an embodiment, the buyer's computing device contains two mathematical functions referred herein as $M1_B$ and $M2_B$. Similarly, the seller's computing device contains two mathematical functions referred herein as $M1_S$ and $M2_S$. The functions may also be referred to as M1 and/or M2 if no distinction is intended between the buyer's side and the seller's side. Various references may be made herein to the "buyer" generating M1 and/or M2, or the "seller" generating M1 and/or M2. Those references should be understood as referring to the computing devices of the buyer or seller generating M1 and/or M2. The output of M1 and M2 are referred herein as M1($x$) and M2($x$), respectively, wherein "x" represents the content of the binary object. For instance, M1$_B$ and M1$_S$ may be functions which, when applied to a binary object, produces a constant scalar value "A" dependent on the content of the binary object, e.g.,: A=M1$_B$($x$).

M2 is a function that produces a visually and easily recognizable output on a display device. Furthermore, when M2 is combined with M1, it produces a visual image that a human can recognize to be similar to a visual image produced by M2 alone. However some aspect of the visual image such as the amplitude, phase, or its orientation to the Y-axis may change as the output of function M1 changes. This is analogous to a human signature, which is recognizable despite changes in size, location, orientation, color, or the pen type used to produce the signature. M1 can change other characteristics, but a casual observer should be able to recognize easily and intuitively that M2 is the same M2 as before, but has become distorted by M1.

Various embodiments described herein may use M1 to change different characteristic of M2. For instance, M2 may be a periodic function (e.g., a sine function) having various characteristics either of the function M2 itself or of the display of M2, such as an amplitude 'A', a characteristic frequency, a phase, a rotational angle of display, line thickness, line type, line color, darkness, fill types, animation or other time-varying display, etc. Persons skilled in the art will recognize that many other kinds of functions may be used for M1 and/or M2, e.g., fractals, other functions having a repetitive visual representation, combinations of periodic functions representable by a Fourier series, etc. M2 may even produce an audible output, to provide verification by audio methods rather than visual methods. It is preferable that M2 is periodic and repetitive so that: First, M2 produces an output that is easy to recognize; and Second, M2 produces an output that retains its visual characteristics and is recognizable even when distorted by M1.

Devices for controlling the display are well known and available for commercial devices, such as a mouse, roller ball, track ball, joystick, pressure-sensitive pad, arrow keys, touch sensitive screen, etc.

Similarly, persons skilled in the art will recognize types of visual functions for M2 that are not easily recognizable, for instance a function M2 that produces very minor and easily overlooked differences in the output of M2 for different inputs, or a function that produces pseudonoise-like output in which it is difficult for a human to recognize differences. The functions M1 and M2 are embedded in the computing device, and are unique to the device, yet should be exportable in a secure way so that, for instance, a user can produce a document on a home desktop PC, then later verify the returned document on a laptop. M1 and M2 are not otherwise retrievable outside of the computing device, and may be extremely difficult to reverse engineer, given only the content "x" of the binary object and M1($x$) or M2($x$). It should not be possible to reverse engineer M1 and M2 with practical limitations of computing power and computing time, in order to ensure non-repudiatability of the exchanged binary objects.

Each time a binary object associated with the transaction at hand is generated, for instance an invoice, payment voucher, receipt, etc., function M1 is applied to the binary object by the computing device. M2 is then modified using M1($x$), and the output of M2 is included with the binary object, for instance by appending to the end or inserting at the beginning. The output of M2 may also be referred to as an authenticator. The visual characteristics of M2 is thus retained but the original M2 is not retrievable by the receiver or any other snooper as it has been distorted by M1($x$).

For example, suppose "x" represents a purchase order from a buyer, in binary format. The buyer computes M1$_B$($x$), and modifies his own M2 by M1$_B$($x$), calling it M2$_B$, and transmits [x+M2$_B$] to the seller, wherein the object within the brackets is a first binary object that includes the authenticator M2$_B$. The seller receives the purchase order and produces an invoice "y".

The seller then concatenates "y" to the received purchase order (i.e., to [x+M2$_B$]), forming the composite object ([x+M2$_B$]+y) and computes the function M1$_S$([x+M2$_B$]+y). Using this computed result, M2$_S$ is generated by modifying the seller's original M2, and the seller transmits the composite object [((x+M2$_B$)+y)+M2$_S$] back to the buyer. This is a composite binary object including a concatenation of the first binary object generated by the buyer, the seller's invoice, and the M2$_S$ generated by the seller. Both M2$_B$ and M2$_S$ are generated using M1$_B$ or M1$_S$ over the entire composite binary object generated so far up to the point at which they are used. M2$_B$(M1$_B$( )) and M2$_S$(M1$_S$( )) have no relationship and dependency and hence are not compared. Each specific M2 is compared by either party with its own previously stored respective M2. Its own M2 should be an exact match. The other party's M2 should likewise be an exact match to its own previously stored M2, and the M2 received from the other party in this round of document exchange will be similar to but distinct from the M2 received from the other party during earlier rounds of document exchange for this same transaction.

The buyer has stored the M1$_B$ and M2$_B$ of the object he has sent previously. When he receives the composite object he first detaches the extra instrument and authenticator appended by the seller, and then recomputes M1$_B$ and M2$_B$ on the remainder of the composite object. The stored M2$_B$ and the recomputed M2$_B$ are displayed and visually compared. The stored M2$_B$ and the recomputed M2$_B$ act as authenticators, and should be identical if the received binary object is authentic. He can also compare the previously stored M2$_S$ and the now received M2$_S$. These should look similar although not exactly same. This cycle repeats with each additional document that is generated (e.g., payment information, receipt, etc.), and can repeat indefinitely, and at each iteration the visual comparisons give increased confidence. If the displays do not match at any stage, then one of the parties (typically the buyer) can terminate, reinitiate, or resume from a step at which the party still had confidence in the transaction.

Typical operation of the embodiments here may be illustrated with the help of a sample transaction described below. This sample transaction is not intended to be limiting in any way. The steps of the transaction are:

(1) Buyer stores and sends to the seller [x+M2$_{B1}$], in which "x" may be, e.g., a purchase order
(2) Buyer receives from the seller [((x+M2$_{B1}$)+y)+M2$_{S1}$], in which "y" may be, e.g., an invoice.
(3) Buyer stores x, y, received M2$_{B1}$, and M2$_{S1}$
(4) Buyer compares the sent M2$_{B1}$ and the received M2$_{B1}$. These should be identical when compared visually. If they are the same it means the buyer's "x" has not been modified, and also it means that "y" corresponds to "x" and cannot be repudiated.

The buyer can then see the display of $M2_{S1}$, and the buyer can know that it has come from the seller if the buyer has dealt with the seller earlier, because it should look familiar and similar to the seller's M2. In this respect it is similar to a trademark, e.g., a company logo. If the buyer has not dealt with the seller before, then the buyer can wait for the next round of composite object where he will get the seller's M2 again but with a different characteristic, e.g., a different amplitude.

Each communication between the parties is in the form of a composite binary object, which includes a binary object and M2(M1(( ) computed over at least a portion of the binary object. Each time a party of the transaction receives a new composite binary object from the other party of the transaction, the received binary object will include binary object(s) purportedly produced by the first party. Let "x" represent the binary object originally sent by the first party, and let "$x_R$" represent the binary object received from the other party, in which $x_R$ is purported to be the same as x. The first party can confirm in a simple manner that $x=x_R$ (i.e., that $x_R$ is genuine) by computing $M2(M1(x_R))$ and comparing to $M2(M1(x))$. Since M2 is a function that produces a displayable visual output, it will be simpler and easier to detect differences in $M2(M1(x_R))$ compared to $M2(M1(x))$ by comparing the displays of those functions, rather than comparing $x_R$ to x directly. Optionally, $M2(M1(x))$ may be stored by the first party when x was sent to the second party, thereby eliminating the need to recomputed $M2(M1(x))$ each time a new purported $x_R$ is received.

Various controls over the display may be included to facilitate the comparison of $M2(M1(x_R))$ to $M2(M1(x))$. For instance, a "move" or "drag picture" display control can be included to move the display of $M2(M1(x_R))$ over the display of $M2(M1(x))$ to visually observe whether the two displays exactly coincide. However, the display control will not affect visual aspects of the display of M2 which are intended to be the result of differences in the underlying binary object. For instance, if $M2(M1(x))$ produces a sine wave that differ only in phase when the underlying binary object x changes, then the display control will not allow the display of $M2(M1(x_R))$ to be moved, so that $M2(M1(x_R))$ is not mistaken for $M2(M1(x))$, unless there is some indicator or mechanism in the display to show a phase reference point.

If the display of $M2(M1(x_R))$ has been visually confirmed to exactly coincide with the display of $M2(M1(x))$, then the buyer and/or seller can be comfortable that the digital object x has not been tampered with, and the seller cannot deny that he has received the object x from the buyer because the seller has sent back to the buyer the composite object that includes x and the seller's M2. This process may be repeated at each stage of the transaction as additional binary digital objects are generated, and previous digital objects be verified at any time by comparison of the appropriate visual displays. When the transaction is complete, both parties can have increased assurance that exactly the same integrated composite instrument combining all the binary digital objects have been exchanged between the parties, as authenticated by M1 and M2. The integrated composite instrument can be retained for future reference in case of any dispute between the parties.

Figure 1:
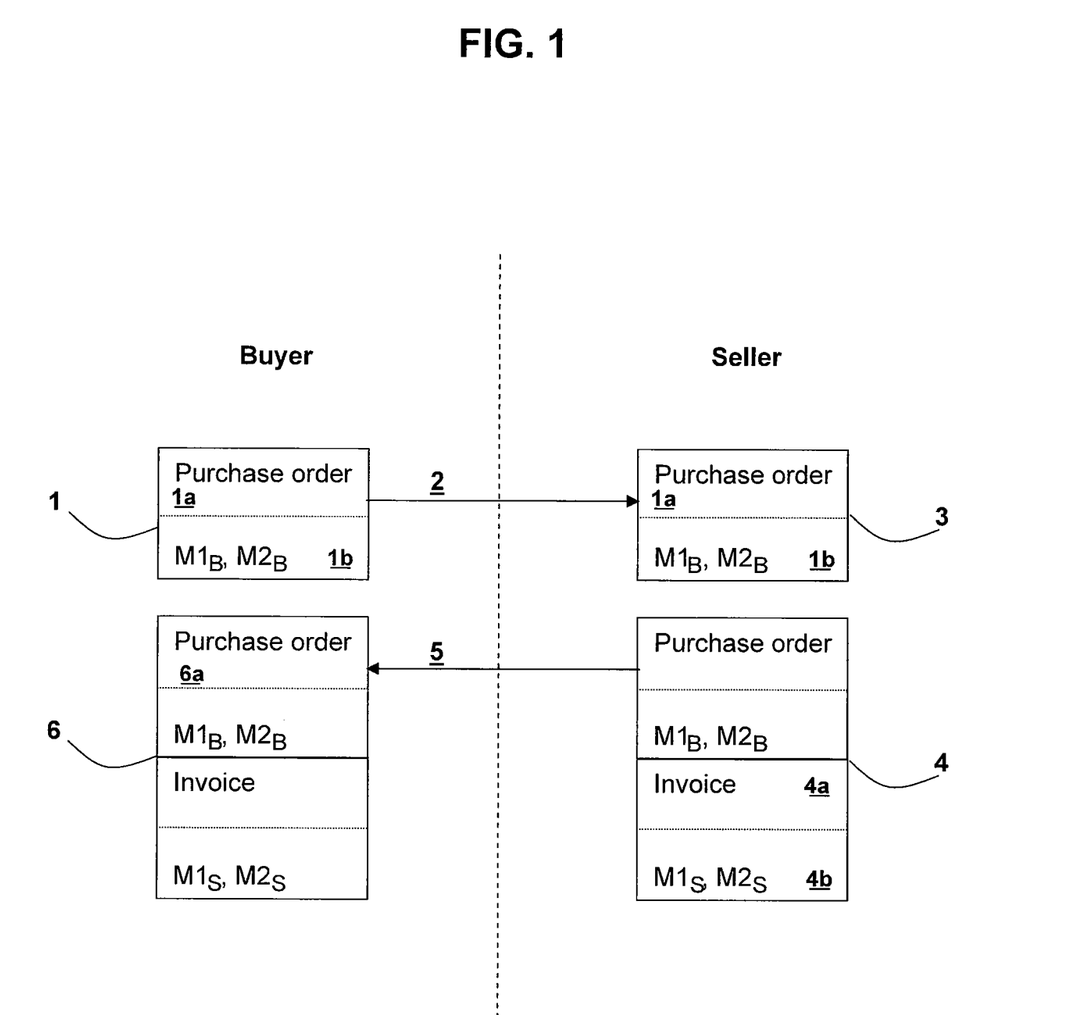
FIG. 1 shows a typical exchange of messages according to an embodiment.

FIG. 1 illustrates a sample transaction. A first composite binary digital object 1 is generated by a buyer, including a purchase order 1a and the output 1b of functions $M1_B$ and $M2_B$. The first composite binary digital object 1 is sent by a transmission channel 2 to the seller, who receives a received first composite binary digital object 3. In the absence of transmission errors and/or deliberate tampering, digital object 3 should be the same as digital object 1. The seller then creates a second composite binary digital object 4, which includes the received first composite binary digital object 3 plus a new document 4a (e.g., an invoice) generated by the seller, and output 4b computed over the composite content of purchase order 1a, the buyer's authenticator 1b and the invoice 4a. The second composite binary digital object 4 is sent back to the buyer via transmission channel 5. Channel 5 is not necessarily the same as channel 2. The buyer receives a received second composite binary digital object 6, which includes a received version 6a of the purchase order 1a. Let "x" refer to the content of purchase order 1a, and let $x_R$ refer to the content of the received version 6a. The buyer can compute and display $M2_B(M1_B(x_R))$, and compute and display $M2_B(M1_B(x))$, and verify the integrity of $x_R$ (i.e., that $x_R=x$) by visually comparing the displays and ensuring that the displays are exactly the same. If the displays are not exactly the same, then there has been either a transmission error or deliberate tampering with the binary digital objects.

Figure 2:
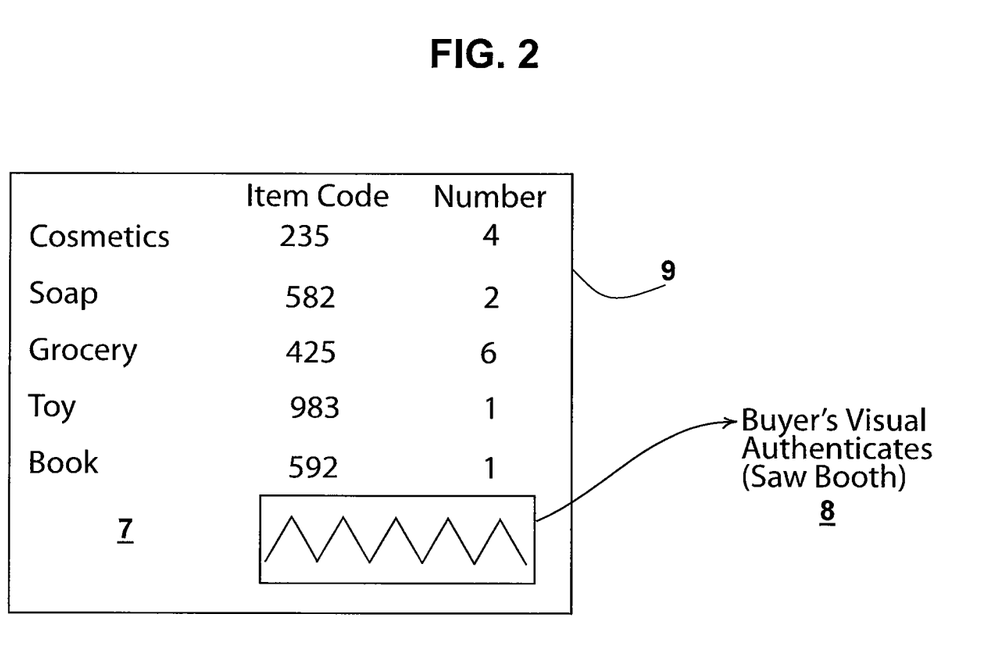
FIG. 2 shows an illustration of a buyer's binary object according to an embodiment.
Figure 3:
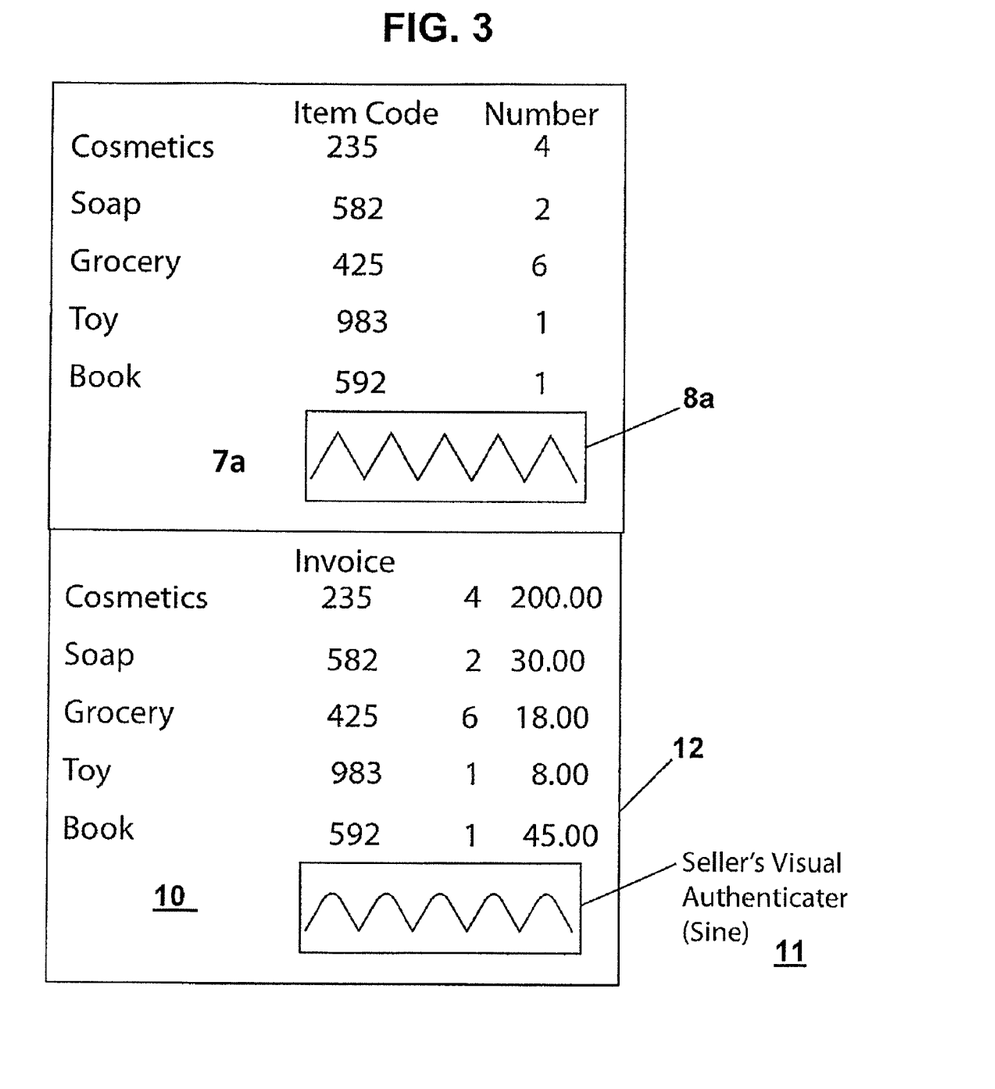
FIG. 3 shows an illustration of a binary object received by the buyer from a seller, according to an embodiment.

FIGS. 2-3 illustrate another example of a transaction. In FIG. 2, a buyer has created a shopping basket 7 of items to buy. He calculates the $M1_B$ and $M2_B$ functions, producing a visual display 8, which in the example shown is a sawtooth function. The shopping basket 7 and visual display 8 together form a binary digital object 9. Binary digital object 9 is sent to the seller (not shown).

FIG. 3 illustrates a communication received back from the seller after accepting the order. The communication includes the buyer's purported original shopping basket 7a, the buyer's purported visual display 8a, along with the seller's invoice 10, a visual display 11 that is the result of $M1_S$ and $M2_S$, and binary digital object 12. The buyer can compare purported visual display 8a to a stored version of his visual display 8, and if they match exactly then the buyer can be assured that purported original shopping basket 7a is the same as shopping basket 7. Alternatively, the buyer can recompute $M1_B$ and $M2_B$ over the purported original shopping basket 7a and verify that the resulting display is exactly the same as his original visual display 8.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the re recitation of "two recitations," without other modifiers, typically means at least two recitations, or two or more recitations). Furthermore, in those instances where a convention analogous to "at least one of A, B and C," etc. is used, in general such a construction is intended in the sense one having skill in the art would understand the convention (e.g., "a system having at least one of A, B and C" would include but not be limited to systems that have A alone, B alone, C alone, A and B together, A and C together, B and C together, and/or A, B and C together, etc.). In those instances where a convention analogous to "that least one of A, B or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references, including but not limited to patents, patent applications, and non-patent literature are hereby incorporated by reference herein in their entirety.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method comprising:
calculating, by a first computing device, a first displayable authenticator derived from an input binary object that is to be exchanged as part of a transaction;
producing a first composite binary object by attaching the first displayable authenticator to the input binary object;
transmitting the first composite binary object to a second computing device;
receiving, by the first computing device, a second composite binary object from the second computing device, the second composite binary object comprising:
the input binary object;
the first displayable authenticator; and
a second displayable authenticator,
wherein the second displayable authenticator is calculated by the second computing device and derived from the first composite binary object;
calculating a third displayable authenticator derived from the second composite binary object;
facilitating a comparison of a display of the first displayable authenticator to a display of the third displayable authenticator; and
verifying an integrity of the input binary object of the second composite binary object based on a match between the display of the first displayable authenticator and the display of the third displayable authenticator.

2. The method of claim 1, wherein the calculating the first displayable authenticator comprises:
calculating a first function responsive to the input binary object; and
calculating a second function responsive to the first function, wherein the second function produces the first displayable authenticator.

3. The method of claim 1, wherein the third displayable authenticator is derived from the input binary object.

4. The method of claim 2, wherein the calculating the first function produces a scalar value responsive to the input binary object.

5. The method of claim 2, wherein the calculating the second function comprises producing a periodic display as the first displayable authenticator.

6. The method of claim 2, wherein the calculating the second function comprises producing the first displayable authenticator as a function representable as a Fourier series.

7. The method of claim 1, wherein the calculating the first displayable authenticator comprises:
calculating a plurality of functions arranged in a sequence,
wherein a first function of the plurality of functions is responsive to the input binary object,
wherein a second function of the plurality of functions is responsive to the first function;
wherein each function of the plurality of functions between the first function and a last function of the plurality of functions is responsive to a function of the plurality of functions that is immediately prior in the sequence,
wherein the last function is configured to produce the first displayable authenticator, and
wherein a display of the first displayable authenticator is responsive to an output from the last function.

8. The method of claim 1, wherein the calculating the first displayable authenticator, comprises:
computing a display parameter of the first displayable authenticator; and
rendering a display of the first displayable authenticator using the display parameter.

9. The method of claim 1, wherein the comparison of the display comprises controlling at least one of the first displayable authenticator and the third displayable authenticator.

10. The method of claim 9, wherein the controlling comprises moving.

11. The method of claim 9, wherein the controlling comprises an action selected from the group consisting of dragging, stretching, rotating, enlarging, diminishing, adjusting phase, changing color, and changing thickness.

12. An apparatus, comprising:
a first computing device configured to:
calculate a first displayable authenticator derived from an input binary object that is to be exchanged as part of a transaction;
produce a first composite binary object by attaching the first displayable authenticator to the input binary object;
transmit the first composite binary object to a second computing device;
receive a second composite binary object from the second computing device, the second composite binary object comprising:
the input binary object;
the first displayable authenticator; and
a second displayable authenticator,
wherein the second displayable authenticator is calculated by the second computing device and derived from the first composite binary object;
calculate a third displayable authenticator derived from the second composite binary object;
facilitate a comparison of a display of the first displayable authenticator to a display of the third displayable authenticator; and
verify an integrity of the input binary object of the second composite binary object based on a match between the display of the first displayable authenticator and the display of the third displayable authenticator.

13. The apparatus of claim 12, wherein the first computing device is further configured to:
calculate a first function responsive to the input binary object; and
calculate a second function responsive to the first function, the second function producing the first displayable authenticator.

14. The apparatus of claim 12, wherein the third displayable authenticator is derived from the received binary object.

15. The apparatus of claim 13, wherein the first computing device is further configured to produce a scalar value responsive to the input binary object.

16. The apparatus of claim 13, wherein the first computing device is further configured to produce a periodic display as the first displayable authenticator.

17. The apparatus of claim 13, wherein the first computing device is further configured to produce the first displayable authenticator as a function representable as a Fourier series.

18. The apparatus of claim 12, wherein the first computing device is further configured to:
calculate a plurality of functions arranged in a sequence;

calculate a first function of the plurality of functions responsive to the input binary object;

calculate a second function of the plurality of functions responsive to the first function;

wherein each function of the plurality of functions between the first function and a last function of the plurality of functions is responsive to a function of the plurality of functions that is immediately prior in the sequence, wherein the last function is configured to produce the first displayable authenticator, and wherein a display of the first displayable authenticator is responsive to an output from the last function of the plurality.

19. The apparatus of claim 12, wherein the first computing device is further configured to:

transmit at least a portion of the input binary object to a computing device;

compute a display parameter of the first displayable authenticator;

transmit the display parameter to a display device; and render the first displayable authenticator using the display parameter.

20. The apparatus of claim 12, wherein the first computing device comprises a display configured to control at least one of the first displayable authenticator and the third displayable authenticator.

21. The apparatus of claim 20, wherein the control comprises moving.

22. The apparatus of claim 20, wherein the control comprises an action selected from a group consisting of dragging, stretching, rotating, enlarging, diminishing, adjusting phase, changing color, and changing thickness.

23. A non-transitory computer-readable medium storing executable instructions that, when executed, cause a first computing device to perform operations comprising:

calculating a first displayable authenticator derived from an input binary object that is to be exchanged as part of a transaction;

producing a first composite binary object by attaching the first displayable authenticator to the input binary object;

transmitting the first composite binary object to a second computing device;

receiving a second composite binary object from the second computing device, the second composite binary object comprising:

the input binary object; the first displayable authenticator; and a second displayable authenticator, wherein the second displayable authenticator is calculated by the second computing device and derived from the first composite binary object;

calculating a third displayable authenticator derived from the second composite binary object;

facilitating a comparison of a display of the first displayable authenticator to a display of the third displayable authenticator; and verifying an integrity of the input binary object of the second composite binary object based on a match between the display of the first displayable authenticator and the display of the third displayable authenticator.

* * * * *

UNITED STATES PATENT AND TRADEMARK OFFICE
CERTIFICATE OF CORRECTION

PATENT NO. : 8,656,176 B2  
APPLICATION NO. : 12/257140  
DATED : February 18, 2014  
INVENTOR(S) : Natarajan Page 1 of 1

It is certified that error appears in the above-identified patent and that said Letters Patent is hereby corrected as shown below:

On the Title Page, in Item (75), under "Inventor", in Column 1, Line 1, delete "Rajaram Natarajan Lalgudi," and insert -- Rajaram Lalgudi Natarajan, --, therefor.

On the Title Page, in Item (56), under "OTHER PUBLICATIONS", in Column 2, Line 1, delete "Chung;," and insert -- Chung, --, therefor.

On the Title Page, in Item (56), under "OTHER PUBLICATIONS", in Column 2, Lines 7-12, delete "Chin-Chen Chang; Chi-Yien Chung; , "An enhanced buyer seller watermarking protocol," Communication Technology Proceedings, 2003. ICCT 2003. International Conference on , vol. 2, No., pp. 1779-1783 vol. 2, Apr. 9-11, 2003 doi: 10.1109/ICCT.2003.1209872 URL: http://ieeexplore.ieee.org/stamp/stamp.jsp?tp=&arnumber=1209872&isnumber=-27227.".

In the Specification:

In Column 7, Line 12, delete "M2(M1(( )" and insert -- M2(M1( )) --, therefor.

In Column 10, Line 51, delete ""that least" and insert -- "at least --, therefor.

Signed and Sealed this  
Sixteenth Day of September, 2014

Michelle K. Lee  
*Deputy Director of the United States Patent and Trademark Office*

UNITED STATES PATENT AND TRADEMARK OFFICE
CERTIFICATE OF CORRECTION

PATENT NO. : 8,656,176 B2  Page 1 of 1
APPLICATION NO. : 12/257140
DATED : February 18, 2014
INVENTOR(S) : Rajaram Natarajan Lalgudi It is certified that error appears in the above-identified patent and that said Letters Patent is hereby corrected as shown below:

<u>Title Page,</u>
Item [75], Inventors, "Rajaram Lalgudi Natarajan" (as corrected to read in the Certificate of Correction issued September 16, 2014) is deleted and patent is returned to its original state with the inventor name in patent to read -- Rajaram Natarajan Lalgudi --.

Signed and Sealed this
Eleventh Day of November, 2014

Michelle K. Lee
*Deputy Director of the United States Patent and Trademark Office*